June 28, 1938.                R. W. THOMAS                2,121,936
                    COMBINATION EXCESS FLOW AND CHECK VALVE
                              Filed May 1, 1934

SECTION—A-A

INVENTOR.
ROSSWELL W. THOMAS

BY

ATTORNEY.

Patented June 28, 1938

2,121,936

UNITED STATES PATENT OFFICE 2,121,936

COMBINATION EXCESS FLOW AND CHECK VALVE

Rosswell W. Thomas, Detroit, Mich., assignor to Phillips Petroleum Company, Bartlesville, Okla., a corporation of Delaware Application May 1, 1934, Serial No. 723,399

6 Claims. (Cl. 137—153)

My invention relates to a combination valve capable of checking excess flow as well as preventing back flow in pipe lines or conduits used in the transportation of gases or liquids under pressure when the flow becomes excessive.

This device, although operative and applicable to any kind of pipe line used in transporting such commodities as gas, gasoline, oil or other liquids, is particularly useful in connection with lines transporting highly volatile liquids such as propane, butane and the like.

An object of my invention is to provide for an automatic check or closing off of flow in a pipe line when the flow in said line becomes abnormally high, due, for instance, to a break in the line. The checking of the flow occurs at the valves on both the upstream and the downstream side of the line break.

Another object of this invention is to automatically check or close off the flow in the opposite direction of the line of flow in case of a line break. This closing of the valve prevents a back flow of the contents of the line, and closes off such back flow at the valve on the downstream side of the line break.

An apparent advantage of this device is the conservation of valuable commodities in case of a line break, the loss being limited to the contents of the line between two adjacent installations of my invention.

Another advantage is that by reducing the amount of escaping gas or volatile liquid the attending hazards are greatly reduced. Commodities of this character are not only inflammable but may be dangerous from other standpoints.

These and other advantages will appear as the description proceeds, taken in conjunction with the drawing which forms a part of this specification and in which drawing.

Figure 1:
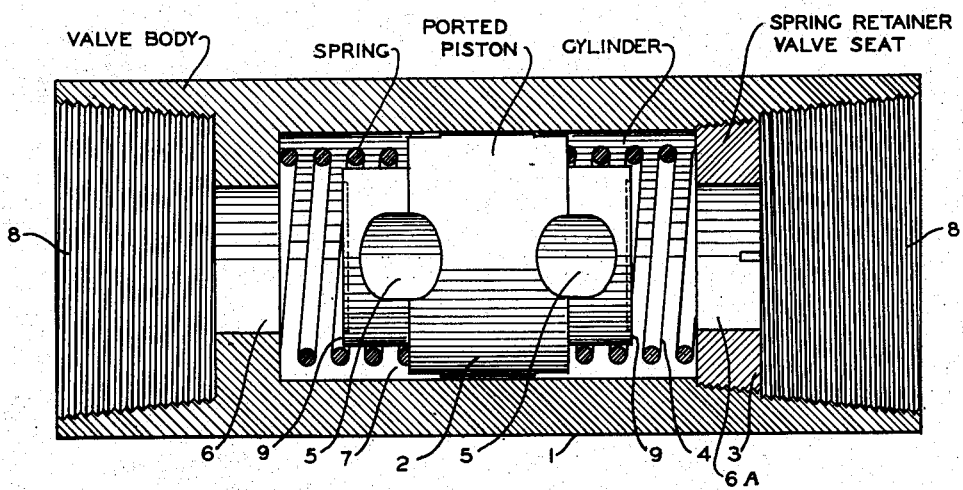
Figure 1 is a central longitudinal section through the body of a combination excess flow and check valve.
Figure 2:
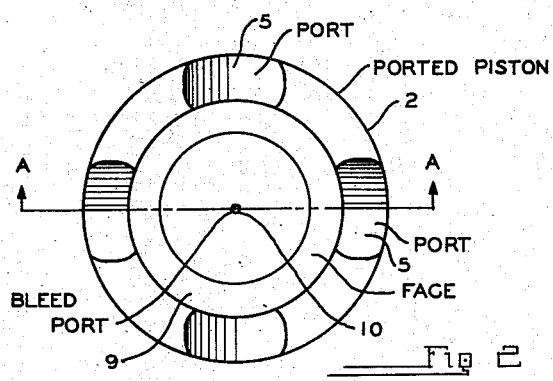
Figure 2 is an end view of the ported piston.
Figure 3:
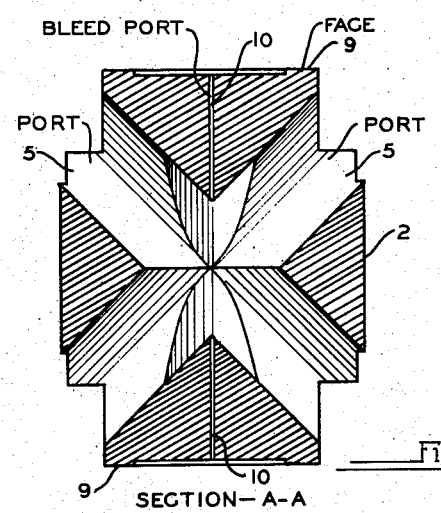
Figure 3 is a central sectional view of the ported piston on the line A—A of Figure 2.

In the drawing wherein similar characters designate corresponding parts throughout the views, 1 represents the body of the valve, the ends of which are threaded interiorly as at 8 so as to receive the threaded ends of joints of pipe. An open passageway extends throughout the length of the device. The diameter of said passageway as at 6 approximately corresponds in size with the inside diameter of the pipe line. At one end of the valve body the passageway 6 extends a short distance into the valve body to an inner chamber or cylinder 7, the diameter of which is sufficiently greater than that of passageway 6 to provide an end or shoulder for the cylinder which permits a closing of passageway 6 upon the seating of the face 9 of piston 2 and also provide a retaining seat for one of the springs 4. At the opposite end of the valve body 1, a replaceable valve seat 3 is screwed into position and is provided with an open passageway 6a, approximately corresponding in size to the inside diameter of the pipe line, said passageway extending a short distance into the valve body to the inner chamber or cylinder 7. The diameter of cylinder 7 is greater than that of the passageway 6a, so as to provide a seat for the face 9 of the piston 2 and also provide a retaining seat for the other of the springs 4. The piston 2 is freely movable within the cylinder 7 and is provided with ports 5, or any other suitable means for forming passageways to allow fluid to flow past the piston. These ports 5 may be arranged as shown in Fig. 3 intersecting at the center of the piston in which case the gas entering each port meets at the center of the piston and is diverted into another port resulting in a tortuous stream. The gas in any one port cannot follow a straight line through the piston since to do so would mean that the stream would have to pass through another stream passing through one of the other ports. The fact that each stream follows a tortuous course results in an impact force on the piston which tends to move the same. This effect can be replaced or augmented by any form of pressure drop across the piston. Thus by making the effective area of ports 5 at their intersection less than the area of each of passageways 6 and 6a, a pressure drop will occur across piston 2. The central portion of piston 2 is slightly greater in diameter than the diameter of each of its ends which provides a shoulder at each side of the central portion forming seats thereupon for the seating of springs 4. The faces 9 of piston 2 are closed except for bleed ports 10, and are adapted to close off the flow in passageway 6 when either one of said piston ends or faces 9 is forced against an end of cylinder 7.

Assuming that my excess flow and check valve is installed in a liquefied petroleum gas pipe line, the operation of my invention will be as follows: The piston is guided in the bore or chamber 7, and the closed ends are normally kept from seating against the inlet and outlet passageways by any suitable means such as springs mounted around the ends of the piston. When the flow in the line becomes excessive, as would be the case if a break occurred in the line, the differential pressure across the piston caused by the restriction of the ports would overcome the resistance of the spring, which normally resists the movement of the piston in the direction of flow through the valve, and force an end of the piston to seat against the passageway of the line. This seating of the piston against the valve seat closes off the flow except for a small leak made possible by any suitable means such as a bleed port 10 extending through the center of the piston. Although this bleed port which is the preferred embodiment need not be located in the center of the piston, it is essential that some leakage take place to aid the spring in its action to return the piston from a seated position to a neutral position. The bleed port acts to equalize the pressure on both sides of the piston after the excess flow has stopped. This leakage is of course held at a low point so that no appreciable amount of liquid or gas will escape while the line break is being repaired.

I believe that the construction, operation and advantages of my invention may be readily understood from the foregoing description, and while I have shown and described the preferred embodiment which has been found to give satisfactory results, it is to be understood that I do not restrict myself to the details, as the same are susceptible of modification in various particulars without departing from the spirit or scope of the invention.

What I claim as new and desire to secure by Letters Patent, is:

1. In a valve of the character described, a valve body having an axial passageway therethrough and including an inner cylindrical chamber terminating at each end in a port of a lesser diameter than that of said chamber, oppositely disposed valve seats within said chamber adjacent said ports, a piston having transverse passageways passing therethrough disposed and longitudinally slidable within said chamber and having a center portion of greater diameter than the remainder thereof, and including end portions adapted to contact and close off either one of said ports when seated against the corresponding one of said valve seats, the total cross sectional area of said transverse passageways being not greater than that of either of said ports.

2. In a valve of the character described, a valve body having an axial passageway therethrough, a restricted opening at each end of said passageway, said passageway forming a central cylindrical chamber having continuous walls of a larger diameter than said restricted passageway and interposed therebetween, oppositely disposed valve seats at the ends of said passageway, and a valve piston having transverse ports passing therethrough disposed and longitudinally slidable within said chamber, the total cross sectional area of said transverse ports being not greater than that of either of said restricted openings.

3. A pressure controlled valve comprising a body portion having an enlarged chamber therein, restricted inlet and outlet openings in communication with said enlarged chamber, oppositely disposed valve seats in said chamber adjacent said openings, a longitudinally slidable piston in said enlarged chamber provided with end portions adapted to abut either of said valve seats and close communication between the adjacent of said restricted openings and said enlarged chamber, transverse ports extending through said piston, the total cross sectional area of said ports being not greater than that of either of said restricted openings, and means normally tending to hold said piston away from said seats.

4. A pressure controlled valve comprising a body portion, restricted inlet and outlet openings in communication with an enlarged chamber in said body portion, oppositely disposed valve seats in said chamber adjacent said openings, a longitudinally slidable piston in said enlarged chamber provided with end portions adapted to abut either of said valve seats and close off communication between the adjacent of said restricted openings and said enlarged chamber, diagonal ports extending through said piston and intersecting therein, the cross sectional area of said ports at the point of intersection being not greater than that of either of said restricted openings, and spring means normally tending to hold said piston away from said seats.

5. A pressure controlled valve as claimed in claim 4 including a restricted passageway extending axially through said piston.

6. In a valve of the character described, a valve body having an axial passageway therethrough enlarged to form an inner cylindrical chamber and having portions of reduced diameter forming shoulders at each end of said chamber, a piston slidable in said chamber having a main portion sealingly engaging the walls of said chamber and reduced portions at each end thereof, the reduced portions of said piston having faces adapted to contact said shoulders to close either one of said passage portions of reduced diameter while maintaining said main portion of said piston spaced from said shoulders, said piston having a passageway through said main portion opening at each end in said chamber intermediate of said faces.

ROSSWELL W. THOMAS.